March 6, 1951  W. W. PAGET  2,544,612
PRESSURE RESPONSIVE MEANS
Original Filed July 25, 1942

Inventor:
Win W. Paget.
by Louis A. Maxson.
atty.

Patented Mar. 6, 1951

2,544,612

UNITED STATES PATENT OFFICE 2,544,612

PRESSURE RESPONSIVE MEANS

Win W. Paget, Michigan City, Ind., assignor to Joy Manufacturing Company, a corporation of Pennsylvania Original application July 25, 1942, Serial No. 452,299. Divided and this application February 13, 1948, Serial No. 8,269

6 Claims. (Cl. 137—153)

My invention pertains to pressure responsive means, and particularly, though it is not limited thereto, to pressure responsive means especially adapted to altitude compensation for use in the control of the air supply to aircraft cabins by a supercharger operative selectively as a mere displacement device and as a compressor having a predetermined in-built range of compression.

In my copending application, Serial No. 452,299, filed July 25, 1942, now Patent No. 2,477,002, July 26, 1949, for Air Pumping Apparatus, of which application this present one is a division, there is described a supercharger for the supply of air to an aircraft cabin and of the intermeshing helical rotor type including a casing and intermeshing rotors and intake means and two discharge openings, one opening into communication with the pockets formed by the coaction of the rotors when said rotors have compressed the fluid in said pockets through a predetermined range of compression, and the other discharge opening being so positioned that the pockets formed by the coaction of the rotors reach the same before they attain to the first mentioned discharge opening and that said pockets, in fact, reach it substantially as their communication with the intake means is cut off, and a valve for closing the second discharge opening, and operating means for the valve having pressure responsive devices, which devices form the specific subject matter of this present application, for controlling the position of the valve.

The pressure responsive valve controlled means is governed by ambient pressure, and when the aircraft reaches a predetermined height, the pressure responsive means causes its associated valve to move in a manner to effect the actuation of the valve for closing the second discharge opening so that said opening is closed and the air taken in by the supercharger at a considerably reduced pressure will be compressed through a sufficient range of compression so that it may be both warmed and brought to a desirable relation to the cabin pressure then being maintained, which cabin pressure is substantially higher than ambient pressure at that time. The height at which the pressure responsive means control valve will effect closure of the second discharge opening may be on the order of 25,000 feet, and a compression through approximately a 2 to 1 compression ratio will be necessary if air taken in at ambient pressure at 25,000 feet is to be compressed to the pressure corresponding to an 8,000 foot altitude, which pressure may be desirably maintained in the cabin from a level considerably below 25,000 feet to a level substantially higher.

An object of my invention is to provide an altitude compensator which is particularly adapted, but not limited, to use as a part of a cabin air control system. Another object of my invention is to provide an altitude compensator which is simple, compact, and inexpensive to manufacture, but which is sufficiently rugged to give long and trouble-free service. Another object of my invention is to provide an altitude compensator which may be readily adjusted. A further object of my invention is to provide an improved pressure responsive means controlled by a bellows device or the like. Still another object of my invention is to provide an improved pressure responsive means controlled by an evacuated bellows. Other objects and advantages will become apparent as the description proceeds.

In the drawings, in which one illustrative embodiment which my invention may assume in practice is shown, Fig. 1 is a view showing my invention applied to a cabin supercharger, the supercharger being shown in longitudinal section and having parts broken away.

Figure 1:
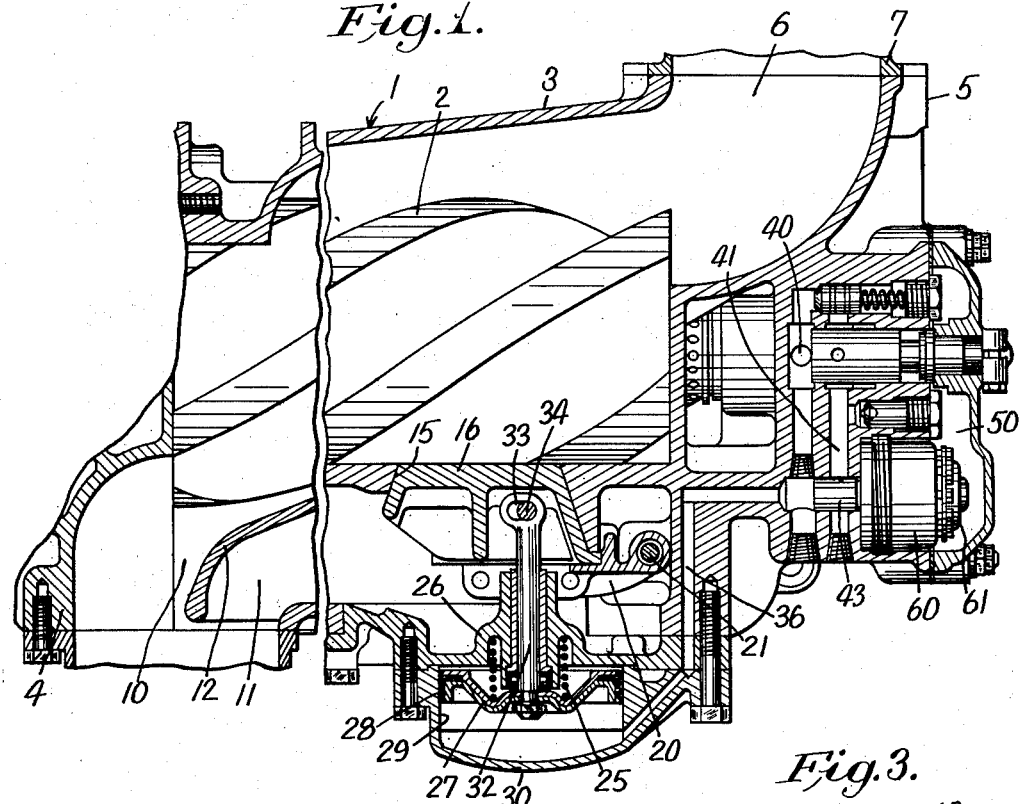
Figure 2:
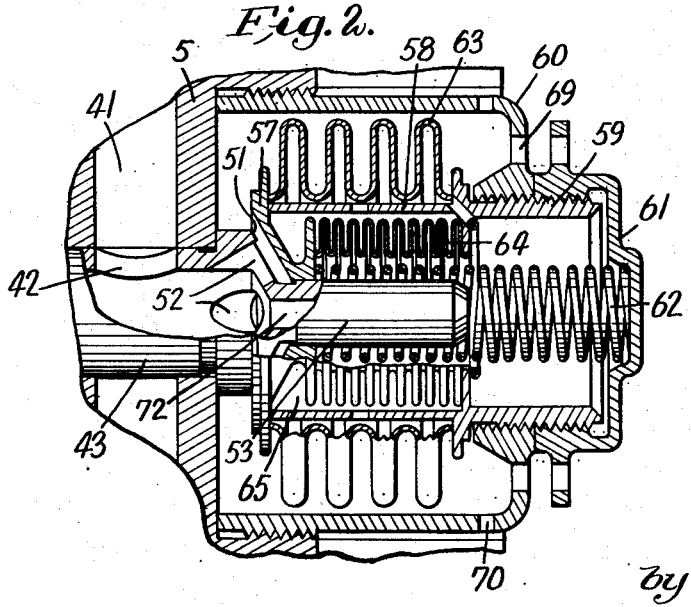
Fig. 2 is an enlarged sectional view, with parts broken away, of the pressure responsive means shown in Fig. 1, the section being taken substantially on the same plane as Fig. 1.
Figure 3:
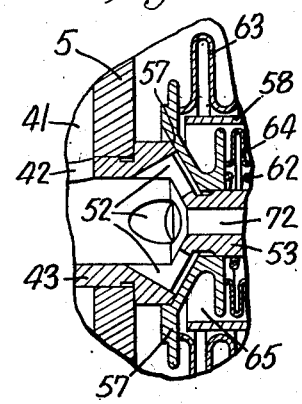
Fig. 3 is a fragmentary view showing a portion of the mechanism of Fig. 2 with the valve element in closed position instead of in open position.

Referring to Fig. 1 there will be noted at 1 a cabin supercharger in the form of a compressor containing intermeshing rotors of which but one is shown, at 2, in this figure. The rotors are supported in intermeshing relation and for rotation in a casing 3, and may be driven in any suitable manner as illustrated in my application, Ser. No. 452,299, hereinabove mentioned. The rotors operate with space packing, as explained in the application just mentioned. The casing 3 is provided with heads 4 and 5, and the latter may be integral with the casing. The casing is provided with an intake chamber 6 which communicates through suitable conduit means, a portion of which is shown at 7, with the exterior of the aircraft cabin to which the supercharger supplies air. This intake chamber communicates with the right hand, low pressure ends of the rotors, and also for a substantial part of the length of the rotors communicates with the back portions thereof, so-to-speak. The casing 3 is provided with a discharge chamber 10 at the left end (high pressure end) of the rotors, and another chamber 11 also communicates with the chamber 10 though it is separated from it for a substantial distance by a web 12. It is unnecessary to describe the drive for the supercharger in this application, as the same is fully disclosed in my copending application, Ser. No. 452,299.

For the automatic control of the initiation of compressive action by the compressor, governed by the pressure of the air surrounding the aircraft, hydraulically operated means is provided, such means being controlled by the pressure responsive or compensating means which forms the subject matter particularly claimed in this application.

As explained in my copending application, the fluid which is sealed in the successively progressively diminishing chambers between the rotors and the walls of the casing 3 would be substantially compressed if no escape or discharge were provided before these chambers came into communication with the chamber 10, but since it is not desirable to have the fluid compressed through such a range, both from the standpoint of useless expenditure of energy and that of the development of unnecessary heat, I have provided means by which material compression can be avoided and unnecessary heating of the cabin prevented. This includes an opening 15 so related to the length of the casing and the angle of the rotors that when the opening 15 is unobstructed, no compression of the fluid will take place before communication with the opening 15 is had, and the relationship of the opening 15 to the discharge opening 10 is such that the air remaining in the pockets in the rotors as these pockets move out of communication with the opening 15 will not be compressed before these same pockets communicate with the discharge 10. All of this is fully explained in my copending application above mentioned.

To control the opening 15, which has a peripheral wall which lies in a surface of a cone, I have provided a valve 16 whose shape is such that when the same is closed it conforms very closely not only to the surface of a cone to which the opening 15 conforms, but also with the walls of the chamber 3. This valve is suitably supported, as more fully disclosed in said application hereinabove mentioned, upon a pivotal support member 20 which is secured by a pivot pin 21 to the wall of the casing 3. The valve 16 is normally maintained open by a spring 25 engaging at one end the wall of a member 26 which forms a portion of the enclosure of the discharge chamber 11 and which is secured in any suitable manner to the casing 3. The other end of the spring acts against a piston 27 having a packing 28 fitting the walls of a cylindrical chamber 29 which is formed in the cylinder providing member 30 also secured in any suitable manner to the casing 3, in a position overlying the member 26. A piston rod or operating stem 32 with an elongated eye 33 is connected at its outer end to the piston 27, and a pin 34 and the eye 33 connect the stem to the valve 16. Piston 27 and the member 30 cooperate in forming a servo-motor to which fluid may be admitted through a connection or passage 36 under the control of my improved pressure responsive means. When the servo-motor is not under pressure delivered through the passage 36, the valve 16 may be opened, from the position shown in Fig. 1, by the spring 25, and in its then inclined position it will offer very little obstruction to the discharge of fluid to the chamber 11 and thence to the interior of the cabin through any appropriate connection. When, however, pressure is supplied under certain predetermined conditions to the servo-motor, the piston 27 will be caused, through the operating stem 32, to close the valve 16 of the compressor or supercharger, which will then operate substantially precisely as though there were no opening 15 available. Thus, depending upon the position of the valve 16, there is provided by the single unit described in outline here and more fully disclosed in parent application, Ser. No. 452,299, in effect both a mere displacement pump and a compressor capable of substantial compression of the air taken in. That this compression may be in practice from one very substantial subatmospheric pressure to a higher one which is itself less than atmospheric does not, of course, alter the fact that there is a definite compression.

For the purpose of this application it is not necessary to describe any portion of the hydraulic system associated with the compressor other than as will now be done. The source of hydraulic pressure may be any suitable one, for example a gear type pump such as is shown in my copending application of which this is a division, and it need only be said for the purposes of this case that the fluid under appropriate pressure is supplied from a suitable source, not shown, through a conduit 40 into a passage 41 which communicates through an opening 42 in a sleeve 43 with the interior of that sleeve, and the interior of said sleeve is connected, as shown in Fig. 1, with the conduit 36. As long as a sufficient pressure exists in the passage 41, a sufficient pressure will exist beneath the piston 27 to close, and maintain closed, the valve 16, but the valve may be caused to be opened whenever the pressure in the passage 41 and in the passage 36 can be overcome by the action of the spring 25. The necessary reduction in the pressure within the passage 41 may be effected by opening a vent from that passage, and I have provided an improved pressure responsive means controlled valve mechanism subject to ambient pressure for permitting at desired times such venting to occur. It may be noted that the head 5 contains a chamber 50, which communicates, as explained in my copending parent application, with a sump from which liquid is drawn for placing under pressure and delivery through the passage 40, and, as also there explained, the chamber 50 is connected with external pressure—ambient pressure. The member 43 has a valve seat surface 51 and a plurality of ports or passages 52 open through the valve seat 51, which may be noted to be annular in form at its valve seat portion; and it will be further observed that this member has a central guide extension 53. Reciprocably mounted on this guide extension is a valve element 57. The movement of this valve element in an opening direction is limited by a sleeve portion 58 formed on a threaded sleeve member 59 which is supported in a further sleeve mounting element 60 carried by a wall of the casing 3. An adjustable closure element and spring tension regulator 61 engages a spring 62 which acts upon the valve 57 and normally tends to seat it. Connected to the valve 57 and to the sleeve member 59 at opposite sides of the sleeve portion 58 are bellows devices 63 and 64 bounding a chamber 65 in which the sleeve 58 is enclosed, and this sleeve is perforated so that free communication may at all times exist throughout the interior of this chamber. The chamber 65 is evacuated and the compression of the spring 62, which is adjustable, is so determined that until the pressure acting upon the exterior of the bellows arrangement falls to a predetermined low value, the valve 57 will be held firmly open against the stop sleeve 58. When, however, the pressure in the casing 60 falls below a predetermined value, the valve 57 will promptly seat and interrupt the discharge of fluid back to the sump and cause the building up of such a pressure beneath the piston 27 as to close the valve 16 and cause the compressor to operate as a "compressor" instead of as a displacement means. It will be noted that the walls of the casing 60 are perforated as at 69 and 70 to permit the fluid passing through the passages 52 to flow freely to the sump through the chamber 50. The chamber 50, as previously noted, is connected to external pressure, that is pressure outside the cabin, in any suitable manner as more fully explained in my copending application. The setting of the spring 62 may be made whatever is desired, but it may desirably be such that the valve 57 is normally open at heights of the aircraft below 25,000 feet. The valve 57 is of the "overbalanced" type, being of the sharp opening variety, so that when the valve 16 is to open it may be permitted to open sharply and cleanly. Extending axially through the guide extension 53 is a passage 72 through which fluid passes to the interiors of the sleeve member 59 and the bellows device 64. When the valve 57 is seated, fluid supplied under pressure through the passage 72 acts against the outer end of the valve and counteracts the increase in pressure on the inner end of the valve by the fluid acting through the ports 52.

It will be observed that the structure described includes a housing 60 for the compound bellows device which consists of the two bellows elements 63 and 64 which cooperate in bounding an evacuated chamber 65. It will be observed that the valve element 57 is connected to one end of the bellows device while the other end of the bellows device is connected to the housing 60 by an externally threaded screw member 59. It will further be noted that a spring 62 acts between the movable end of the bellows and the member 61. If the threaded member 59 is adjusted in either direction relative to the member 60 and the position of the member 61 is kept the same with respect to the casing 60, there will obviously be a variation in the pressure exerted by the spring 62. The openings 69 and 70 provide communication with the sump which is connected with the atmosphere. The degree of opening of the valve 57 will be determined by the position of the sleeve 59 relative to the casing 60 and the sleeve may obviously be adjusted after removing the spring supporting cover 61. It will be observed that the structure of my improved pressure responsive means is simple, is thoroughly effective for the functions which it has to perform, is well protected against injury, is durable, and is adjustable to permit a change in the flight altitude at which closure of the valve 16 is to be effected.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. Pressure responsive means comprising an evacuated bellows, a housing for said bellows, a screw attaching one end of said bellows to said housing, a spring confined between said housing and the opposite end of said bellows to expand the same, said screw being adjustable to vary the position between said housing and the first named end of said bellows, means for connecting the interior of said housing with a source of variable pressure, and valve means controlled by said bellows.

2. Compensating means of the class described comprising a fixed support, an evacuated bellows, an adjustable connection between said support and one end of said bellows, a spring for expanding said bellows, said spring being confined between said support and the other end of said bellows, and pressure controlling means connected to said last named end of the bellows and operated by expansion and contraction thereof.

3. Pressure responsive means comprising a fixed support, an evacuated bellows, an adjustable connection between one end of said bellows and said support, a spring for expanding said bellows, said spring engaging with one end thereof the other end of said bellows, pressure controlling valve means connected to the last mentioned end of the bellows and operated by the expansion and contraction of said bellows, and abutment means for supporting the other end of said spring between which abutment means and the first mentioned end of said bellows there is provision for relative adjustment.

4. Pressure responsive means comprising an evacuated bellows having within the same means for limiting the minimum distance between its opposite ends and having a valve carried by one of its ends, a housing for said bellows, means for adjustably supporting the other end of said evacuated bellows on said housing enabling a desired positioning of said valve in the collapsed position of said bellows, a spring within said housing but outside the space enclosed within the interior of the bellows and engaging and extending from the valve carrying end of the bellows to a point rearward of the other end of said bellows, and an abutment supported by said housing and engaged by the last mentioned end of the spring.

5. Pressure responsive means comprising an evacuated bellows, a housing for said bellows, a screw attaching one end of said bellows to one end of said housing, a spring confined between the aforementioned end of said housing and the opposite end of said bellows, and contacting each of the same, to expand said bellows, said screw being adjustable to vary the position between said housing and the first named end of said bellows, means for connecting the interior of said housing with a source of variable pressure, and valve means controlled by said bellows.

6. Compensating means of the class described comprising a fixed support, an evacuated bellows, an adjustable connection between said support and one end of said bellows, a compression spring for expanding said bellows, said spring being coaxial with said bellows and engaging and confined between said support and the other end of said bellows and exerting on said support and on said other end of said bellows thrusts tending to increase the distance between the same, and pressure controlling means connected to said last named end of the bellows and operated by expansion and contraction thereof.

WIN W. PAGET.

REFERENCES CITED

The following references are of record in the file of this patent:

UNITED STATES PATENTS

| Number | Name | Date |
| --- | --- | --- |
| 2,313,149 | Jacobsson | Mar. 9, 1943 |
| 2,366,146 | Martin-Hurst | Dec. 26, 1944 |

FOREIGN PATENTS

| Number | Country | Date |
| --- | --- | --- |
| 679,386 | France | Jan. 9, 1930 |
| 738,375 | France | Oct. 17, 1932 |